Nov. 3, 1942.          G. MAHLCK          2,300,582
VEHICLE LAMP
Filed Oct. 19, 1940
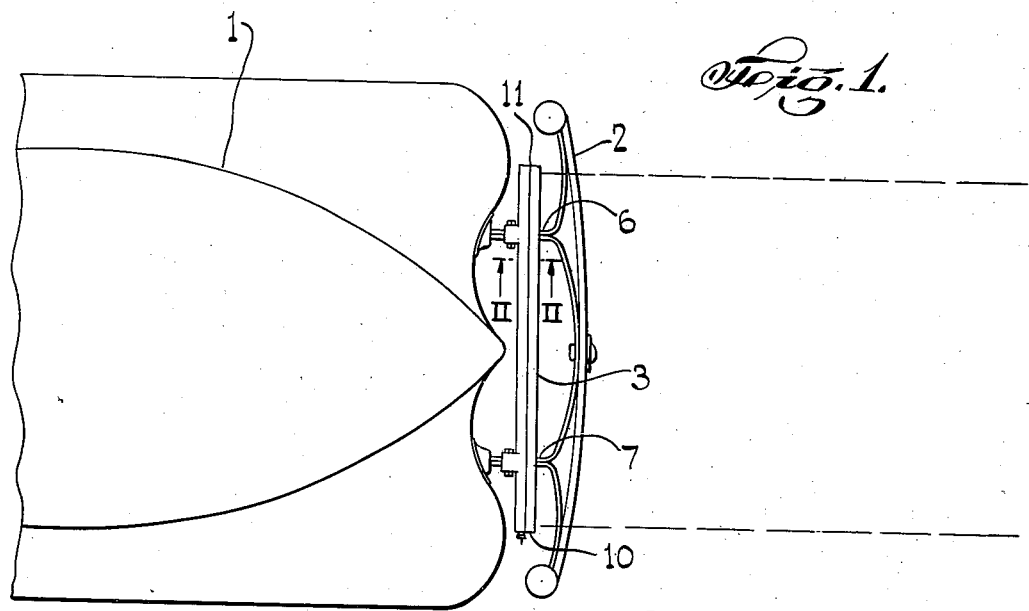
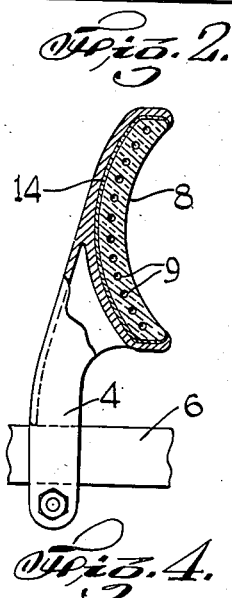
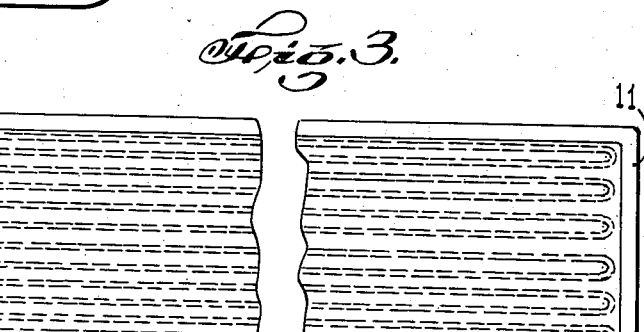
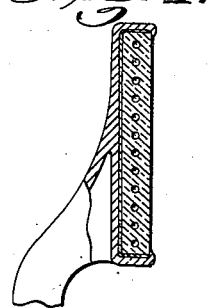
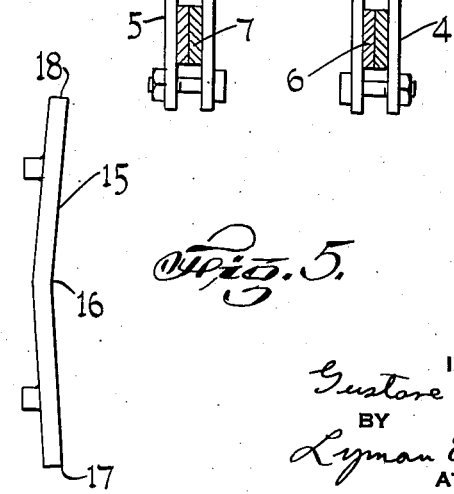
INVENTOR
Gustave Mahlck
BY
Lyman E. Dodge
ATTORNEY Patented Nov. 3, 1942

2,300,582

UNITED STATES PATENT OFFICE 2,300,582

VEHICLE LAMP

Gustave Mahlck, East Orange, N. J.

Application October 19, 1940, Serial No. 361,819

1 Claim. (Cl. 176—14)

This invention relates to illumination, particularly roadway illumination and more especially roadway illumination by a vehicle travelling thereon.

A principal object of this invention is to produce a more even and wider distribution of light ahead of an automobile than now is done.

A further object of this invention is to produce a vehicle headlight in which the light is produced over a large surface rather than at a concentrated point.

Other objects and advantages will appear as the description of the invention and the particular physical embodiments selected to illustrate the invention progresses and the novel features will be particularly pointed out in the appended claim.

In describing the invention in detail, and the particular physical embodiment selected to illustrate the invention, reference will be had to the accompanying drawing and the several views thereon, in which like characters of reference designate like parts throughout the several views, and in which:

Figure 1 is a fragmentary view of a vehicle, such as an automobile, having my improved head lamp in position thereon; Fig. 2 is a cross-sectional view of a portion of Fig. 1 on the plane indicated by the line II—II viewed in the direction of the arrows at the ends of the line; Fig. 3 is a front elevational view of a device embodying my invention in the form of a vehicle headlight; Fig. 4 illustrates a modification of the design of lamp as shown in Fig. 2; Fig. 5 illustrates a modification of the design of lamp as shown in Figs. 1, 2 and 3.

In Fig. 1, numeral 1 designates a vehicle, such as an automobile. The front fender is designated by 2. Preferably, just above the front fender is positioned a device embodying my invention which is to serve as a head lamp and is designated as a whole as 3.

The head lamp of my invention may be supported in any suitable or appropriate manner on any appropriate part of a vehicle. In the particular form illustrated, the head lamp is supported by standards 4 and 5 on the supporting members 6 and 7 of the fender 2.

The lamp, includes a solid block of transparent dielectric material 8 having formed therein a passage or cavity 9. This passage or cavity may be made of any suitable or appropriate length but is preferably of a length much greater than any dimension of the block 8. This cavity is to be formed preferably in the manner set forth in my prior Patent No. 2,156,156, dated April 25, 1939.

The block 18 is preferably considerably elongated as from the point 10 to the point 11 as shown in Fig. 1 or as shown in face view in Fig. 3.

The cavity 9 is to be filled with a gas, any of the well known and suitable gases such as the rare gases such as neon, argon, or helium may be employed and in such quantity as approved by the best modern practice in such devices, and metal vapors, such as sodium and mercury may also be included as illuminants.

The ends of the cavity are provided with electrodes, as 12 and 13, hermetically sealed in.

When current of the proper electromotive force is sent through the passage 9, by means of the electrodes 12 and 13, light is emitted.

In order that the light may be projected forwardly in the best manner, I prefer to make the block 8 concave on its front face, that is, the right hand side face as shown in Fig. 2 and convex on the rear face, that is, the left hand side face as shown in Fig. 2 and to form a mirror 14 on the rear or convex face. This mirror may be of any suitable or appropriate form separate or integral with the block 8 but I prefer to produce a silvering directly upon the block 8 with the reflecting face facing the block.

Although I prefer a concave face lamp as shown in Fig. 2, it may, in many situations be desirable to have a plane face as shown in Fig. 4.

As it may be desirable to avoid too wide a distribution of the light from the lamp, I may also form an obtuse angle in the face of the block 8 so that he will have a block 15 as shown by Fig. 5 in which there is an angle 16 intermediate the ends 17 and 18 of the block whereby the light will all be projected forwardly but the light from one half of the lamp will be inclined slightly to the left and the light coming from the other half of the lamp will be inclined slightly to the right.

Although I have particularly described one particular physical embodiment of my invention and explained the operation, construction and principle thereof, nevertheless, I desire to have it understood that the form selected is merely illustrative but does not exhaust the possible physical embodiments of the idea of means underlying my invention.

What I claim as new and desire to secure by Letters Patent of the United States is:

A vehicle lamp, including, in combination: an elongated block of transparent dielectric material, said block being a segment of a hollow cylinder and in cross-section at a right angle to its length formed with a rear convex face and a forward concave face, said block further having a passage therein of greater length than any dimension of the block, a rare gas in the passage, electric terminals, one at each extreme end of the passage, a mirror formed on one side of the block facing the block and means adapted for supporting the block on the front of an automobile with the mirror face facing forward whereby light is projected forwardly of the vehicle onto a roadway.

GUSTAVE MAHLCK.